United States Patent [19]

Weng et al.

[11] Patent Number: 5,425,502
[45] Date of Patent: Jun. 20, 1995

[54] VAV AIR CONDITIONING SYSTEM WITH A BY-PASS AIR SUPPLY FAN

[75] Inventors: K. Lianq Weng, Kuo-Liang Weng; both of Taichung, Taiwan, Prov. of China

[73] Assignee: Yu Feng Enterprise Co., Ltd., Taichung, Taiwan, Prov. of China

[21] Appl. No.: 280,517

[22] Filed: Jul. 26, 1994

[51] Int. Cl.⁶ ............................................. G05D 23/13
[52] U.S. Cl. ................................. 236/13; 236/49.3; 417/5; 454/258
[58] Field of Search ................. 236/13, 49.3; 165/39; 417/5; 454/255, 256, 258

[56] References Cited

U.S. PATENT DOCUMENTS

| | | | |
|---|---|---|---|
| 2,266,217 | 12/1941 | Kingsland | 236/13 |
| 4,294,403 | 10/1981 | Ammons et al. | 236/13 |
| 4,516,628 | 5/1985 | Ward | 236/13 X |
| 4,917,174 | 4/1990 | Ring | 236/13 X |
| 4,949,782 | 8/1990 | Braud | 165/39 X |

*Primary Examiner*—William E. Tapolcai
*Attorney, Agent, or Firm*—Browdy and Neimark

[57] ABSTRACT

A VAV air conditioning system has a micro-computer control device, a main fan motor, a by-pass fan motor, a heat exchange pipe assembly. The micro-computer control device has a function setting unit, temperature detecting units, a central processing unit and an output control unit and a power supply unit. A control circuit is used to control the main fan motor to supply air led through the heat exchange pipe assembly in accordance with a loading requirement in a closed space so that the temperature thereof can be precisely controlled. As a conditioning loading is lowered, the control circuit can make the main fan motor slow down so as to reduce the supply of conditioned air volume, causing a decrease of main air supply. In the meanwhile, the control circuit outputs another power variable signal to a by-pass fan motor which can produce air supply led directly into the closed space without going through the heat exchange pipe assembly. The speed of the by-pass fan is increased to supply extra air so that the sum of the main air supply and the by-pass air supply is equal to a constant. After a loading requirement and the air conditioning capacity of an air conditioning system reaches equilibrium it can stably maintain a basic ventilation air supply.

2 Claims, 6 Drawing Sheets

VAV AIR CONDITIONING SYSTEM WITH A BY-PASS AIR SUPPLY FAN

BACKGROUND OF THE INVENTION

The present invention relates to a VAV (Variable Air Volume) air conditioning system having an additional by-pass air fan and mainly equipped with a micro-computer control unit, a main air supply fan motor, a by-pass fan motor, a heat exchange pipe assembly. The micro-computer control unit has a control circuit which is responsible for control of a main air supply fan motor (the supplied air flowing via the heat exchange pipe assembly to remove heat therefrom or add heat thereto ) and a by, pass air supply fan motor which delivers air without going through the heat exchange pipe assembly to a closed space, permitting both fan motors to operate stagelessly from 0 to 100% of its full capacity, so as to regulate the air conditioning capacity of the air conditioning system according to instant conditions of a closed space, keeping the temperature thereof constantly in a state of equilibrium.

As shown in FIGS. 1, 2, a conventional CAV (Constant Air Volume) air conditioning system is comprised of a motor 1, a heat exchange pipe assembly 2 and a control circuit 3. Shown in FIG. 2 is the control circuit. The control circuit 3 can only effect 3-stage speed variation, and such 3-speed motor only runs at specific fixed speeds. There are several disadvantages associated with such a conventional motor and given as follows:

1. It is difficult to control precisely the temperature of a closed room; a conventional air fan motor can only be operated in a number of fixed speeds so that a conventional air conditioning system runs adjustably in 3 options, i.e., strong (100%), medium (85% ) and weak (70%), unable to cope properly with air conditioning loadings; such performance makes a room temperature easily fluctuated, making people uncomfortable therein.
2. The poor adjustability of the conventional air conditioning system makes the efficiency of the related equipment low, causing waste of electrical energy.
3. The air fan motor must be operated in a number of speeds, usually in 3 speeds, to cooperate with a 3-option temperature control switch, the cost of a motor and the related control circuit is unavoidably increased.

SUMMARY OF THE INVENTION

The primary object of the present invention is to provide an air conditioning system having a fan motor whose speed can be varied in a stageless manner so as to make a closed enviroment air conditioned in a better way.

Another object of the present invention is to provide an air conditioning system having a main air fan motor and a by-pass fan motor which both can be operated in a range from 0% to 100% of their full capacity in accordance with the temperature variation of a closed room so that the system can be economically operated and can better perform to provide comfort to people in a closed space.

One further object of the present invention is to provide an air conditioning system which is equipped with a by-pass air fan motor selectively supplying additional air which is not led through a heat exchange means to a closed space in cooperation with a stageless speed variable fan motor so as to make a room temperature of a closed space precisely adjusted.

DETAILED DESCRIPTION OF THE PREFERRED EMBODIMENT

Figure 1:
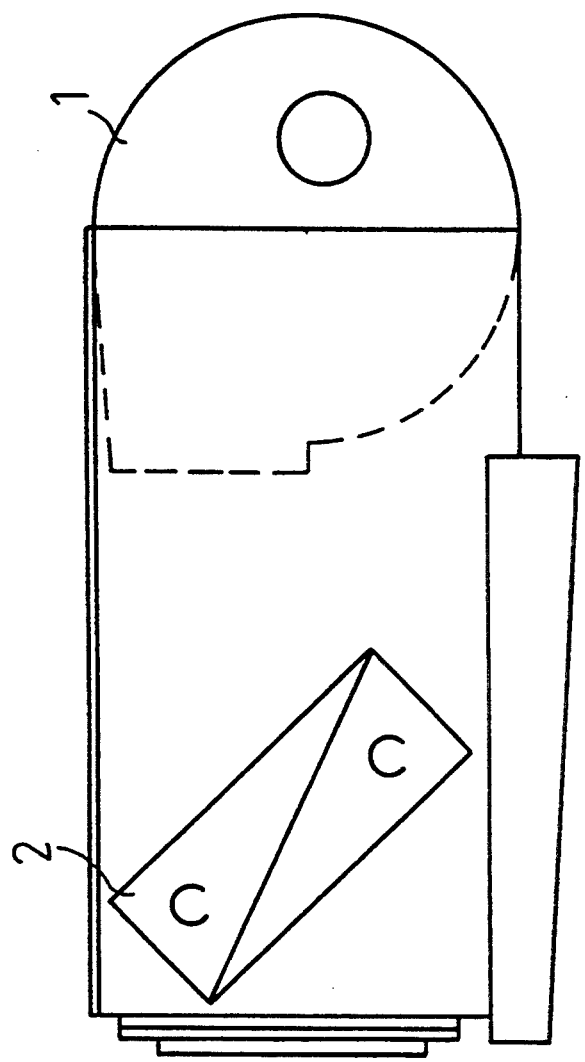
FIG. 1 is a sectional view showing a conventional air supply system.
Figure 2:
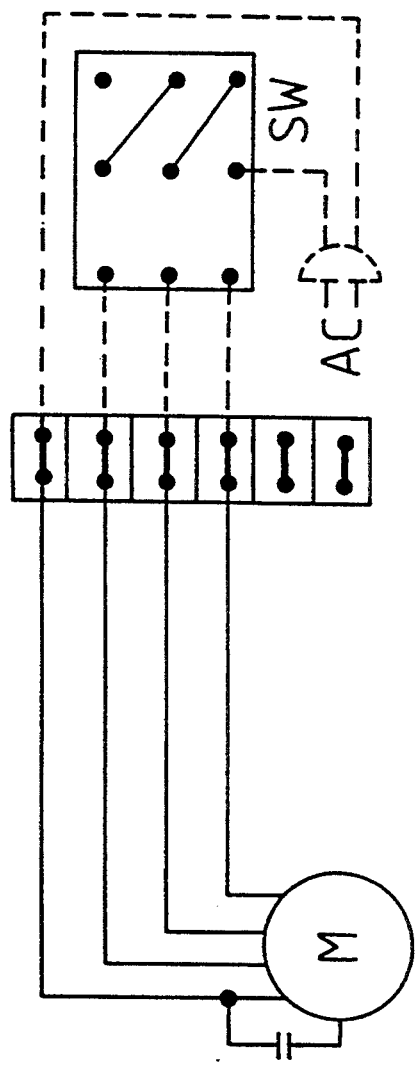
FIG. 2 is a control circuit of a conventional air supply system.
Figure 3:
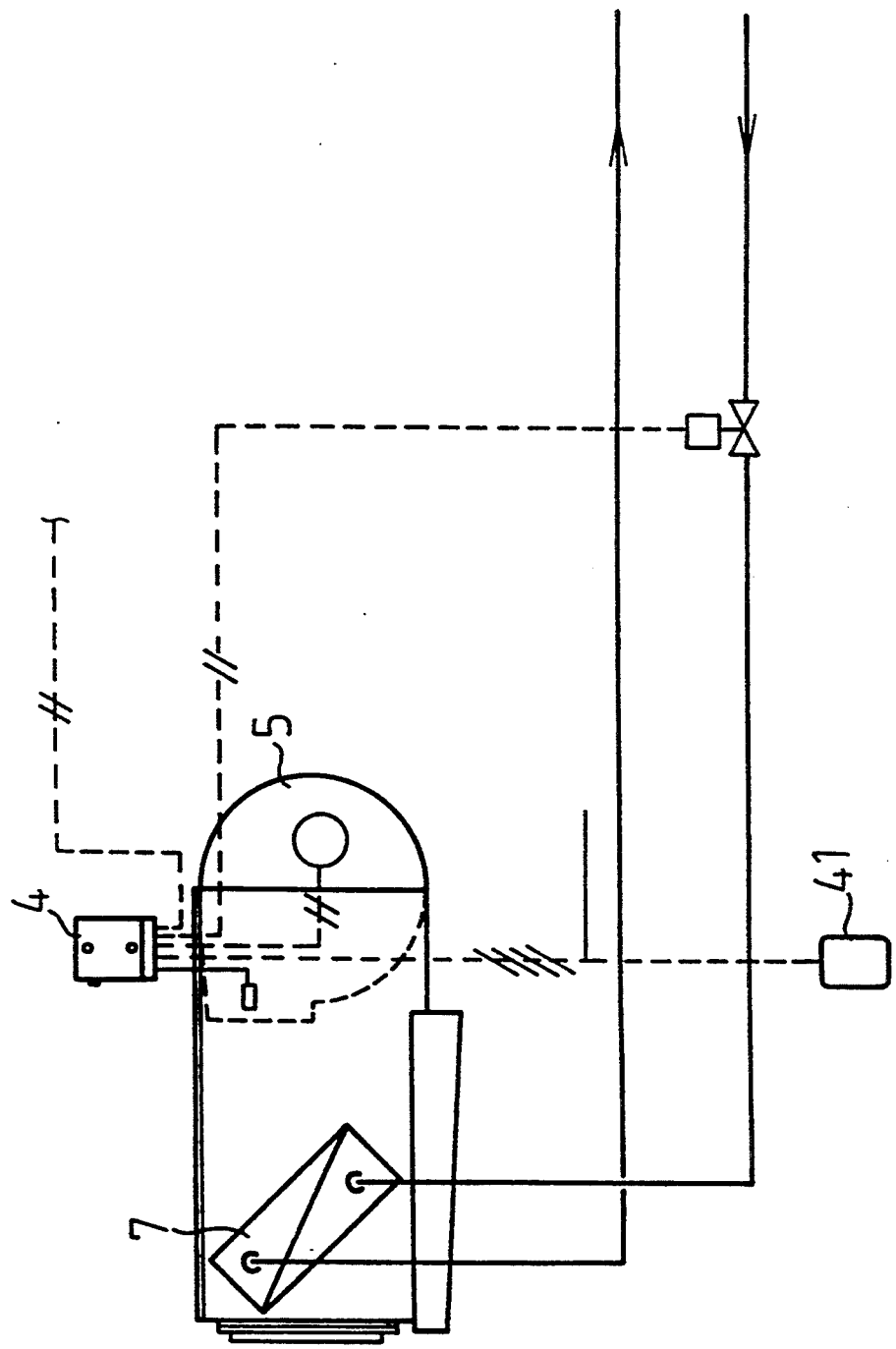
FIG. 3 is a diagram showing the arrangement of the air supply device of the present invention.
Figure 4:
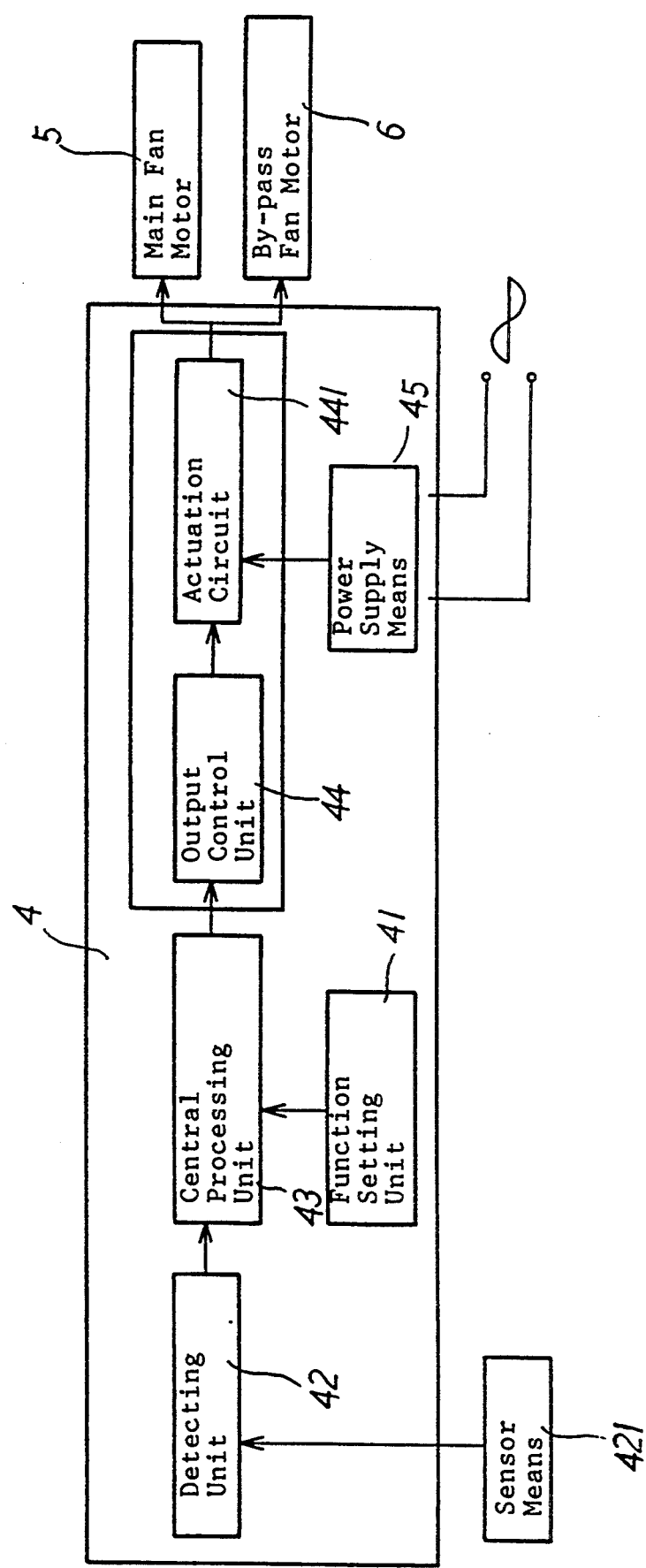
FIG. 4 is a block diagram of the by-pass air supply system of the present invention.

Referring to FIGS. 3, 4, a VAV (Variable Air Volume) stageless air supply varying device for use in an air conditioning system is mainly comprised of a micro-computer control unit 4, a main fan motor 5, a by-pass fan motor 6, a heat exchange pipe assembly 7.

As shown in FIG. 4, the micro-computer control unit 4 is chiefly made up of a function setting means 41, detecting means 42, a CPU 43, an output control unit 44 and a power supply means 45.

The function setting means 41 is mainly employed to input various set data such as temperatures and corresponding operation speeds into the CPU 43 for use in various inner programs as reference data so as to permit the CPU 43 to operate according to these input reference data.

The detecting means 42 include sensors 421 used to detect the indoor temperatures or pressures, humidities and etc. It delivers the detected temperatures or other detected values to the CPU 43, so as to permit the CPU 43 to carry out analytic operations on the detected temperatures or detected values in comparison with the preset values input by the function setting means 41.

The CPU 43 has an inner program which can calculate a required operational power. It is mainly based on the input temperatures of the function setting means 41 and the detected temperatures by the detecting means 42 that are delivered to the CPU 43 for calculation, and then output control signals based on the corresponding input data are produced. The control signals are used to actuate an actuation circuit 441 of the output control unit 44 so as to provide a variable power to the main fan motor 5 for operation. Moreover, once the air conditioning system is started, the CPU 43 will constantly pick up detected indoor temperatures or other values by the detecting means 42, and preset temperature values of the function setting means 41, and an output power value of the output control unit 44 that all are used as reference by the CPU 43 for a next output of a control signal.

The output control unit 44 depends on the CPU 43 to input a control signal to actuate an actuation circuit 441 to start the main fan motor 5, and the instant operation speed of the motor 5 is fedback constantly to the CPU 43 so as to permit the CPU 43 to monitor the operation condition of the motor 5.

The power supply means 45 provides required DC power to the above cited units and AC power to the output control unit 44.

Referring to FIG. 4, when the air conditioning system is to be operated, the function setting means 41 provides the CPU 43 with operation modes and preset temperatures, and the CPU 43 proceeds with a comparison operation in which the operation modes and the preset temperatures are compared with the detected indoor temperatures provided by the temperature detecting means 42.

Then the CPU 43 delivers a control signal to the output control unit 44 to regulate the power transmitted to the main fan motor which will operate according to the supplied power. In the meanwhile, the, CPU 43 continues undergoing the above cited comparison operations and produces corresponding signals which are constantly delivered to the output control unit 44 to adjust the operation speed of the fan motor 5 in a stageless manner.

Figure 5:
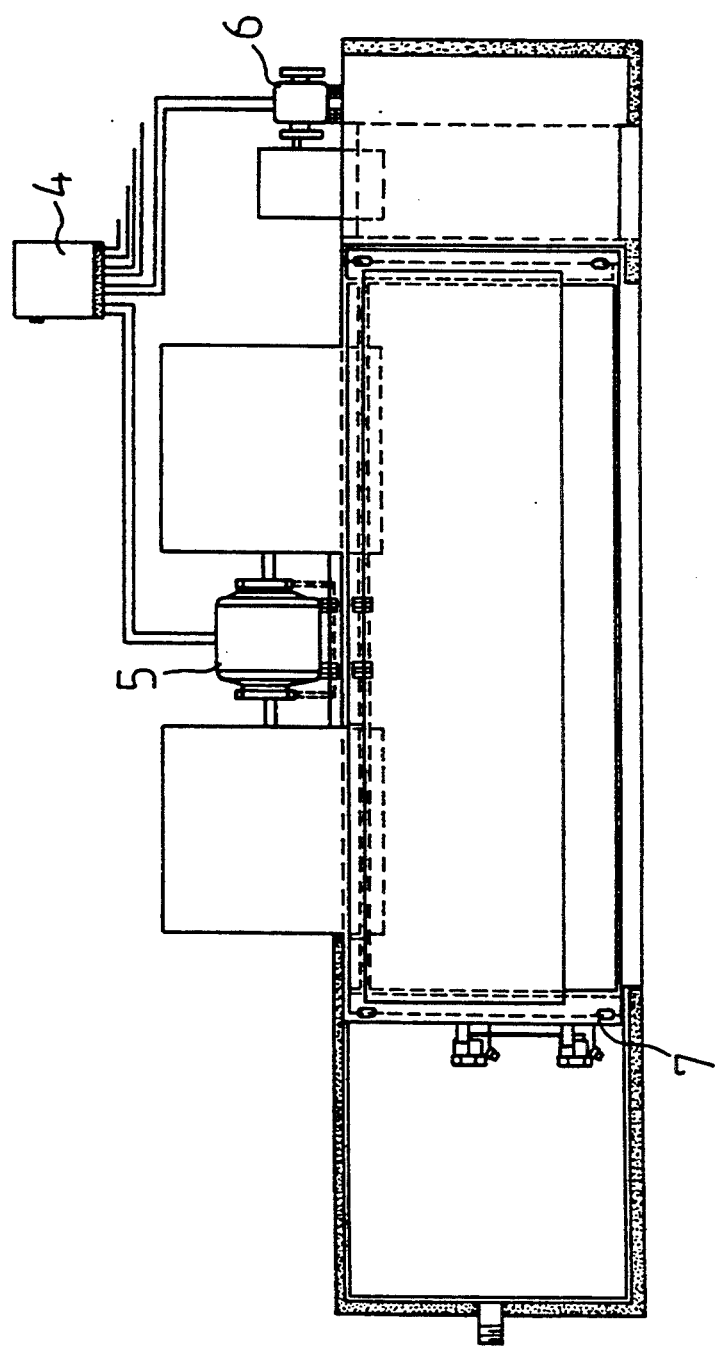
FIG. 5 is a diagram showing the by-pass air supply system of the present invention.

As further shown in FIGS. 4, 5 a by-pass fan motor 6 is added to the main fan motor of the control system. The main fan motor 5 controlled by the micro-computer control unit 4 supplies an air volume QV and can operate in a corresponding capacity in response to the loading requirement of an air conditioned space. The air supplied by the main fan motor 5 is led through a heat exchange pipe assembly 7 so that the air volume QV delivered by the main fan motor 5 can effectively vary the temperature of a closed space. As the temperature of a closed space reaches a state of equilibrium, the conditioning load requirement drops and not much conditioned air is required, only a small amount of air is needed to keep the air of a closed space well circulated. Then, the micro-computer control unit 4 will deliver a control signal to the by-pass fan motor 6 to increase the operation speed thereof. In the meanwhile, the main fan motor 5 is slowed down to reduce the air supply thereof. The air delivered by the by-pass fan motor 6 is not led through the heat exchange pipe assembly 7 and is sent directly into a closed space. The reduced air volume associated with the main fan motor 5 is compensated by the air supply QB delivered by the by-pass fan motor 6. In other words, the total air volume delivered into a closed space is a constant QT. So, energy used in cooling or heating a closed space can be effectively managed without waste in one aspect, and people in such a closed space can feel comfortable in another aspect.

Figure 6:
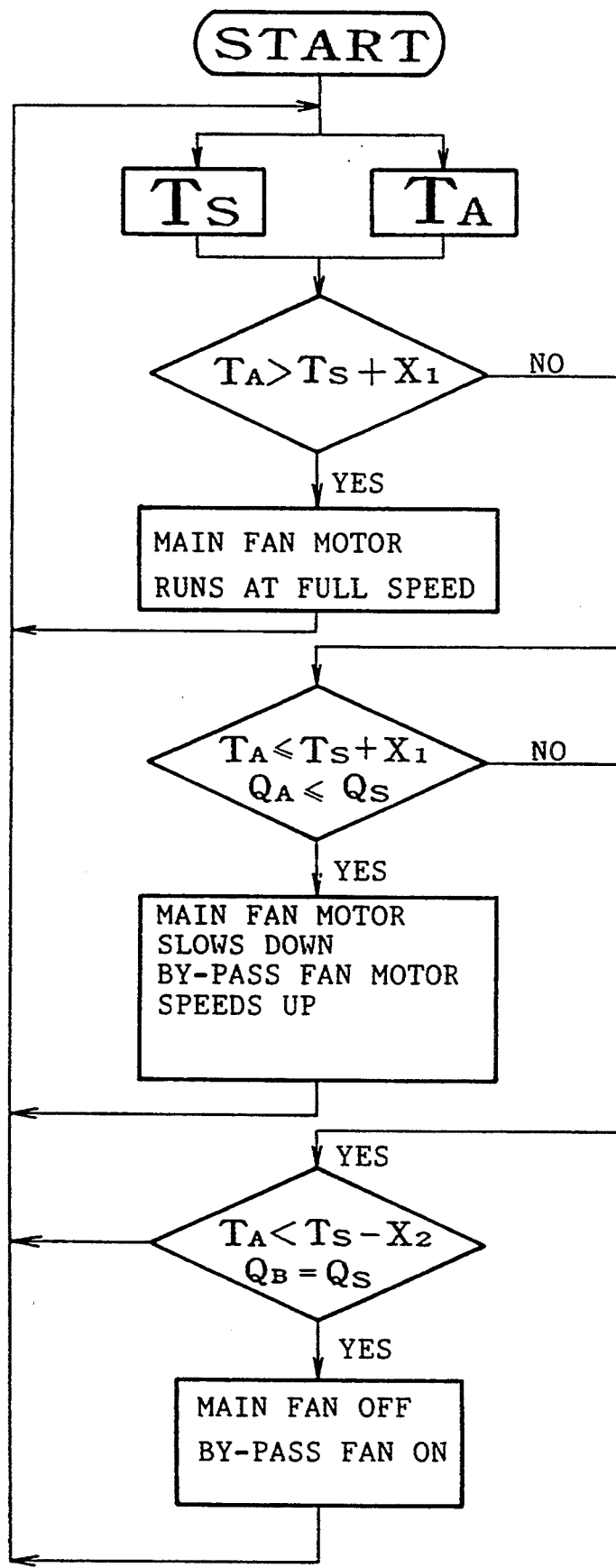
FIG. 6 is a flow chart of the present invention.

As shown in FIG. 6, a flow Chart particularly for a cooling system of the present invention is given to illustrate the logic steps to determine the "on and off" of the main fan motor 5 and the by-pass fan motor 6 and the operation speeds thereof, wherein:

1. When the temperature TA of an air conditioned space is greater than a preset temperature TS plus an upper limit of a temperature difference X1, i.e. $TA > TS + X1$, the space has a relatively high temperature, cooled air is needed. The main fan motor 5 will turn on to operate at full speed, the total air supply QT is larger than a preset basic air supply QS, i.e. $QT = QA$, $QA > QS$.

2. As the temperature TA of an air conditioned space is lower than or equal to a preset temperature TS plus an upper limit of a temperature difference X1, i.e. $TA \leq TS + X1$, the air supply of the main fan motor is lesser than or equal to the basic air supply $Q \leq QS$. It means the temperature of a closed space has reached a preset one, air conditioning loading requirement is dropped and no extra cooled air is needed; at this moment, the computer control unit 4 will send out a signal to the main fan motor 5 to make it slow down so as to reduce the air supply QA thereof. In the meanwhile, the computer control unit 4 delivers a speed-up signal to the by-pass fan motor 6 so as to increase the air supply thereof in compensation for the reduced air volume by the main fan motor so that the total air supply QT is equal to the basic air supply QS, i.e., $QB \approx QS - QA$.

3. In the above cited second state of operation, the operation speed of the main fan motor 5 is reduced in a progressive manner. When the temperature TA of a closed space is lesser than a preset temperature TS minus a lower limit X2, the main fan motor 5 will be turned off and the by-pass fan motor 6 is then operating at full speed so as to make the total air supply QT equal to the preset basic air supply QS, i.e. $QT = QS = QB$.

In summary, the present invention adopts a stagelessly operable main fan motor working in cooperation with a by-pass fan motor that are controlled by a micro-computer control unit whereby air supply including air passing through heat exchange pipe assembly and air not passing therethrough can be variably mixed to obtain different kind of processed air volume according to enviromental requirements constanly.

I claim:

1. A VAV (variable air volume) air conditioning system having an additional by-pass fan motor, comprising:

a micro-computer control means;
   a main fan motor;
   a by-pass fan motor;
   a heat exchange pipe assembly through which air is led;
   said micro-computer control means further comprising:

a central processing unit having inner operation programs;
   a function setting unit for inputting various temperatures and operation speeds into said central processing unit for use in said inner operation programs;
   detecting means having sensors for detection of environmental parameters of a closed space which are then delivered to said central processing unit;
   an output control unit receiving control signals from said central processing unit to actuate an actuation circuit to start said main fan motor the speed of which is then constantly fed back to said central processing unit;
   a power supply source for provision of DC and AC power;
   wherein said output control unit takes control signals transmitted from said central processing unit to vary the operation speeds of said main fan motor and said by-pass fan motor from 0 to 100% of their full capacity in a stageless manner; air supply provided by said main fan motor is delivered through said heat exchange pipe assembly and air supply provided by said by-pass fan motor is not led through said heat exchange pipe assembly and is sent directly into a closed space; whereby the amount of conditioned air sent by said main fan motor can be adjustably mixed with air supplied by said by-pass fan motor by means of said micro-computer control means in such a manner that the total amount of air supply remained constantly equal to the basic air requirement in a closed space in any condition in accordance with the air conditioning loading requirement of said closed space so as to constantly keep the temperature in said closed space in an equilibrium state.

2. A VAV air conditioning system as claimed in claim 1 wherein said heat exchange pipe assembly can either add heat to or remove heat from air flowing therethrough.

* * * * *